United States Patent
Duperray et al.

(10) Patent No.: US 11,678,680 B2
(45) Date of Patent: Jun. 20, 2023

(54) COMPOSITION WITH HIGH FREE AMINO ACID CONTENTS AND USE AS A STARTING MATERIAL AND COMPLETE FEED FOR ANIMAL FEED

(71) Applicant: BRETAGNE CHIMIE FINE, Pleucadeuc (FR)

(72) Inventors: Joel Duperray, Trefflean (FR); Renaud Sergheraert, Baden (FR)

(73) Assignee: BRETAGNE CHIMIE FINE, Pleucadeuc (FR)

( * ) Notice: Subject to any disclaimer, the term of this patent is extended or adjusted under 35 U.S.C. 154(b) by 291 days.

(21) Appl. No.: 16/797,312

(22) Filed: Feb. 21, 2020

(65) Prior Publication Data
US 2020/0275681 A1 Sep. 3, 2020

(30) Foreign Application Priority Data
Feb. 28, 2019 (FR) .................................. 1902112

(51) Int. Cl.
*A23K 20/147* (2016.01)

(52) U.S. Cl.
CPC .................. *A23K 20/147* (2016.05)

(58) Field of Classification Search
CPC ......... A23K 20/147; A23K 10/26; A23J 1/10; C07K 1/12
USPC ........................................................ 426/657
See application file for complete search history.

(56) References Cited

U.S. PATENT DOCUMENTS

| | | | |
|---|---|---|---|
| 5,698,724 A * | 12/1997 | Anderson | C07F 15/065 556/148 |
| 2010/0202936 A1 | 8/2010 | Holtzapple et al. | |
| 2015/0208694 A1 * | 7/2015 | Yu | C07K 14/465 426/657 |
| 2016/0143319 A1 * | 5/2016 | Feugier | A23K 20/163 514/5.5 |
| 2016/0157511 A1 | 6/2016 | Fillières et al. | |
| 2018/0263259 A1 | 9/2018 | Gade et al. | |
| 2022/0369669 A1 | 11/2022 | Fillieres et al. | |

FOREIGN PATENT DOCUMENTS

| | | |
|---|---|---|
| DE | 244 760 A1 | 4/1987 |
| JP | H0311099 A | 1/1991 |
| JP | H10271958 A | 10/1998 |
| WO | 2015/014859 A2 | 2/2015 |

OTHER PUBLICATIONS

Eriksson et al., "A comparison of the effects of intravenous infusion of individual branched-chain amino acids on blood amino acid levels in man", Clinical Science, 1981, pp. 95-100; 6 pages.
Olivry et al., "Extensive protein hydrolyzation is indispensable to prevent IgE-mediated poultry allergen recognition in dogs and cats", BMC Veterinary Research, 2017, pp. 1-9; 9 pages.
Office Action dated Feb. 21, 2023, in corresponding Chinese Application No. 202010119176.4, 13 pages.
Search Report dated Feb. 20, 2023, in corresponding Chinese Application No. 202010119176.4, 4 pages.

* cited by examiner

*Primary Examiner* — Hamid R Badr
(74) *Attorney, Agent, or Firm* — Maier & Maier, PLLC

(57) ABSTRACT

A keratin hydrolysate including at least 94% by weight of free amino acids relative to the total weight of the amino acids of the hydrolysate. The keratin hydrolysate includes at least 93% of free valine relative to the total weight of valine in the hydrolysate, at least 90% free isoleucine relative to the total weight of isoleucine in the hydrolysate, and at least 95% of free leucine relative to the total weight of leucine in the hydrolysate. A method for producing the keratin hydrolysate, a composition comprising the hydrolysate and an animal feed containing the hydrolysate are also disclosed.

19 Claims, No Drawings

COMPOSITION WITH HIGH FREE AMINO ACID CONTENTS AND USE AS A STARTING MATERIAL AND COMPLETE FEED FOR ANIMAL FEED

FIELD

The present invention relates to the field of compositions with high free amino acid contents, notably obtained from keratin hydrolysates, and to the use thereof as starting materials and complete feed for animal feed.

BACKGROUND

Amino acid-based compositions are used in very diverse fields such as nutraceutics, cosmetics, and human and animal nutrition, for very different and specific applications in each of these fields. Mention may notably be made of uses targeting hair growth and sheen, improvement of sleep and stress reduction, and also uses aimed at essential amino acid re-balancing and as a source of proteins in infant nutrition and also in canine and feline nutrition.

One of the ways to obtain an amino acid-based composition is to produce a hydrolysate of keratin materials.

Natural keratin materials comprise mainly high-molecular-weight polypeptides with a highly crosslinked structure which makes it poorly accessible to enzymes. This natural keratin material is poorly digestible. However, it is known that the hydrolysis of keratin materials to amino acids makes it possible to improve the digestibility of said keratin materials.

The keratin hydrolysates proposed for sale, notably as food supplements, as recipe formulation ingredients in animal nutrition or as a starting material for animal feed, are generally obtained by very partial hydrolysis. These hydrolysates generally have a high molecular weight due to the presence of high levels of "bound" amino acids forming peptides. Typically, the molecular weight of the commercially available compositions is at least 5000 Daltons. These keratin hydrolysates are relatively poorly digestible and contain very few or even no free amino acids. Indeed, it is technically difficult and expensive from an industrial point of view to obtain a keratin hydrolysate which has a very high level of free amino acids. In addition, too extensive a hydrolysis runs the risk of denaturing and destroying the amino acids.

The obtaining of such hydrolysates requires know-how based on the use and control of concentrated chemical entrants and also of processes which fall within the field of chemical engineering. This high level of technical requirements explains why the majority of protein hydrolysates present on the market result from a partial and less complete hydrolysis resulting in a lower proportion of free amino acids.

However, as presented in the article "Extensive protein hydrolyzation is indispensable to prevent IgE-mediated poultry allergen recognition in dogs and cats" Olivry et al. BMC Veterinary Research (2017) 13:251, depending on the desired application, it may be advantageous or even necessary to have compositions with a very high free amino acid content.

Patent application JP H0311099A describes keratin hydrolysates obtained in two steps: an acid and/or enzymatic hydrolysis step resulting in the obtaining of a hydrolysate having a molecular weight of between 300 and 5000 Da and a cystine level of between 5 and 18 mol % relative to all of the amino acids, then a step of reduction by electrolysis resulting in the obtaining of a hydrolysate with a molecular weight of between 200 and 3000 Da and a cysteine level of between 5 and 18 mol % relative to all of the amino acids, and also the use thereof in hair cosmetics. The hydrolysate according to the present invention does not comprise cysteine; in addition, it does not have such a high cystine level.

SUMMARY

Surprisingly and advantageously, the authors of the present invention have managed to overcome the problems of the prior art and have obtained a keratin hydrolysate, wherein almost all the amino acids are free amino acids; in particular, the amino acids that are among the most difficult to obtain in free form during the hydrolysis process, such as valine, leucine, isoleucine, are obtained in free form. In addition, the free amino acids obtained according to the invention are neither damaged nor denatured, in particular valine, leucine, isoleucine.

Other aspects, advantages and properties of the present invention are presented in the description and examples which follow.

DETAILED DESCRIPTION

A subject of the present invention is a keratin hydrolysate comprising at least 94%, preferably at least 96%, and more preferably 100% by weight of free amino acids relative to the total weight of the amino acids of the hydrolysate, said hydrolysate comprising at least the following amino acids: at least 93%, preferably at least 95%, of valine in free form by weight relative to the total weight of valine in the hydrolysate, at least 90%, preferably at least 95%, of isoleucine in free form by weight relative to the total weight of isoleucine in the hydrolysate, and at least 95%, preferably 100%, of leucine in free form by weight relative to the total amount of leucine in the hydrolysate.

Preferably, the hydrolysate according to the present invention comprises less than 2 mol %, preferably less than 1 mol % and more preferably less than 0.5 mol % of cystine relative to the total number of moles of amino acids of hydrolysate; more preferably, the hydrolysate does not contain cystine.

According to one preferred embodiment, the keratin hydrolysate is a poultry keratin material hydrolysate.

A second subject of the present invention is directed towards a method for preparing the hydrolysate according to the invention, in which the keratin material is a poultry keratin material, comprising at least the following steps, in this order:

subjecting the keratin material to at least one chemical hydrolysis by means of an acid under conditions suitable for obtaining a hydrolysate comprising at least 88% by weight of free amino acids relative to the total weight of the amino acids of the hydrolysate, the remainder of the amino acids of the hydrolysate being in the form of peptides having a molecular weight of less than or equal to 800 Daltons, extracting the tyrosine and the cystine from said hydrolysate, preferably by means of a base;

desalifying said hydrolysate;

carrying out a filtration, advantageously a nanofiltration, by means of a filtering membrane with a maximum calibre of 300 Da, at a pressure of between 15 and 40 bar and at a flow rate ranging from 300 to 900 l/h;

optionally drying.

The present invention is also directed towards a composition comprising at least 94%, preferably at least 96%, and more preferably 100% by weight of free amino acids relative to the total weight of the amino acids of the composition, said composition comprising at least the following amino acids:

at least 93%, preferably at least 95%, of valine in free form by weight relative to the total weight of valine in the composition;

at least 90%, preferably at least 95%, of isoleucine in free form by weight relative to the total weight of isoleucine in the composition;

at least 95%, preferably 100%, of leucine in free form by weight relative to the total weight of leucine in the composition;

at least 95%, preferably 100%, of threonine in free form by weight relative to the total weight of threonine in the composition;

at least 95%, preferably 100%, of serine in free form by weight relative to the total weight of serine in the composition;

at least 95%, preferably 100%, of glycine in free form by weight relative to the total weight of glycine in the composition;

at least 95%, preferably 100%, of alanine in free form by weight relative to the total weight of alanine in the composition;

at least 95%, preferably 100%, of phenylalanine in free form by weight relative to the total weight of phenylalanine in the composition;

at least 95%, preferably 100%, of lysine in free form by weight relative to the total weight of lysine in the composition;

at least 95%, preferably 100%, of arginine in free form by weight relative to the total weight of arginine in the composition;

at least 95%, preferably 100%, of proline in free form by weight relative to the total weight of proline in the composition.

Said composition according to the present invention can be obtained by mixing free amino acids.

The present invention is also directed towards a starting material for animal feed, comprising from 80 to 100% by weight of the hydrolysate according to the invention or of the composition according to the invention, relative to the total weight of said starting material.

The present invention is also directed towards a complete feed for animal feed, comprising from 5 to 40% by weight of the hydrolysate according to the invention or of the composition according to the invention, relative to the total weight of said complete feed.

The composition according to the invention, which is advantageously a keratin hydrolysate, has a very high free amino acid content which gives it specific properties, notably advantageous nutritional properties, a high or even very high bioavailability, anallergic properties, and also a palatability capacity for terrestrial and aquatic animal species.

One advantage of the composition according to the present invention is that it is highly digestible. The composition according to the invention has an actual amino acid digestibility very close to the maximum possible (100%), measured according to the method described by Cozannet P., Primot Y., Gady C., Métayer J. P., Lessire M., Skiba F., Noblet J. in "Standardised amino acid digestibility of wheat distillers' dried grains with solubles in force-fed cockerels". *British Poultry Science*, February 2011; 52(1): 72-81. This high digestibility makes it possible to use the composition according to the invention in food and food processing fields. The composition according to the invention is also water-soluble; specifically, 1 g of composition according to the invention is soluble in 5 ml of water. This solubility gives it advantageous properties for processing and the development of organoleptic characteristics within the final product, in particular a high palatability capacity. In particular, the very low level of cystine in the hydrolysate contributes to making it very water-soluble.

The hydrolysate according to the present invention stands out by virtue of its high level of amino acids in free form: at least 94%, preferably 96%, advantageously 100% by weight of the amino acids present in the hydrolysate according to the invention are in free form.

The hydrolysate according to the invention also comprises:

at least 93%, preferably at least 95%, of valine in free form by weight relative to the total weight of valine in the hydrolysate, at least 90%, preferably at least 95%, of isoleucine in free form by weight relative to the total weight of isoleucine in the hydrolysate, at least 95%, preferably 100%, of leucine in free form by weight relative to the total weight of leucine in the hydrolysate.

Advantageously, the hydrolysate according to the invention is obtained from natural keratin materials, in particular of poultry, advantageously from poultry feathers. By way of poultry, mention may be made of hens, chickens, turkeys, ducks, geese, etc.

In particular, the hydrolysate according to the present invention is not obtained from human keratin such as the hair.

Advantageously, the amino acid content of the hydrolysate according to the invention ranges from 40% to 90%, preferably from 45% to 87% by weight relative to the total weight of the hydrolysate, the hydrolysate also comprising mineral matter and water. As already mentioned, the amino acids of the hydrolysate according to the invention are essentially free amino acids.

The hydrolysate according to the present invention comprises at least 94%, preferably 96%, advantageously 100% by weight of free amino acids relative to the total weight of the amino acids of the hydrolysate. The free amino acids are not denatured. In addition, the hydrolysate according to the invention has high levels of free branched amino acids: valine, leucine and isoleucine.

In point of fact, these branched amino acids are known to be more difficult to release under identical processing conditions.

Advantageously, the hydrolysate according to the invention comprises the following free amino acids:

at least 95%, preferably 100%, of threonine in free form by weight relative to the total weight of threonine in the hydrolysate;

at least 95%, preferably 100%, of serine in free form by weight relative to the total weight of serine in the hydrolysate;

at least 95%, preferably 100%, of glycine in free form by weight relative to the total weight of glycine in the hydrolysate;

at least 95%, preferably 100%, of alanine in free form by weight relative to the total weight of alanine in the hydrolysate;

at least 95%, preferably 100%, of phenylalanine in free form by weight relative to the total weight of phenylalanine in the hydrolysate;

at least 95%, preferably 100%, of lysine in free form by weight relative to the total weight of lysine in the hydrolysate;

at least 95%, preferably 100%, of arginine in free form by weight relative to the total weight of arginine in the hydrolysate;

at least 95%, preferably 100%, of proline in free form by weight relative to the total weight of proline in the hydrolysate.

Advantageously, at least 94%, preferably 96%, advantageously 100%, by weight of the amino acids present in the hydrolysate have a molar mass of less than or equal to 250 Daltons, preferably at least 98% by weight of the amino acids present in the hydrolysate have a molar mass of less than or equal to 185 Daltons.

Preferably, the hydrolysate according to the present invention comprises the following free amino acids, by weight, relative to the total weight of the amino acids of said hydrolysate:

aspartic acid in a content ranging from 1.00 to 7.50%, preferably ranging from 1.00 to 3.00%, and of preferably 1.89% by weight;

threonine in a content ranging from 3.50 to 6.50%, preferably ranging from 4.00 to 6.00%, and of preferably 5.36% by weight;

serine in a content ranging from 10.00 to 25.00%, preferably ranging from 20.00 to 23.00%, and of preferably 22.08% by weight;

glutamic acid in a content ranging from 2.00 to 10.50%, preferably ranging from 2.00 to 4.00%, and of preferably 2.84% by weight;

glycine in a content ranging from 6.00 to 25.00%, preferably ranging from 20.00 to 23.00%, and of preferably 22.08% by weight;

alanine in a content ranging from 3.50 to 12.00%, preferably ranging from 8.00 to 10.50%, and of preferably 9.46% by weight;

valine in a content ranging from 4.00 to 8.50%, preferably ranging from 4.00 to 5.00%, and of preferably 4.42% by weight;

methionine in a content ranging from 0.10 to 2.00%, preferably ranging from 0.20 to 1.00%, and of preferably 0.32% by weight;

isoleucine in a content ranging from 1.00 to 5.50%, preferably ranging from 1.50 to 3.00%, and of preferably 2.21% by weight;

leucine in a content ranging from 4.50 to 8.50%, preferably ranging from 5.00 to 6.00%, and of preferably 5.36% by weight;

tyrosine in a content ranging from 0.2 to 2.0%, preferably ranging from 0.3 to 1.00%, and of preferably 0.32% by weight;

phenylalanine in a content ranging from 3.50 to 8.00%, preferably ranging from 5.00 to 7.00%, and of preferably 5.99% by weight;

lysine in a content ranging from 0.30 to 3.00%, preferably ranging from 0.50 to 1.50%, and of preferably 0.63% by weight;

histidine in a content ranging from 0.2 to 5.0%, preferably ranging from 0.50 to 1.50%, and of preferably 0.63% by weight;

arginine in a content ranging from 2.50 to 6.50%, preferably ranging from 3.00 to 4.00%, and of preferably 3.79% by weight;

proline in a content ranging from 9.00 to 15.00%, preferably ranging from 10.00 to 13.00%, and of preferably 12.62% by weight.

The method for preparing the keratin hydrolysate according to the invention carries out at least one chemical hydrolysis by means of an acid under conditions suitable for obtaining a hydrolysate comprising at least 88% by weight of free amino acids relative to the total weight of the amino acids of the hydrolysate, the remainder of the amino acids of the hydrolysate being in the form of peptides having a molecular weight of less than or equal to 800 Daltons.

The chemical hydrolysis of the keratin is carried out by means of an acid, preferably a strong acid chosen from hydrochloric acid, phosphoric acid and sulfuric acid, preferably hydrochloric acid.

The acid concentration preferably ranges from 14 to 34% weight.

The acid to feather weight ratio preferably ranges from 3 to 5.

The chemical hydrolysis is generally carried out for a period ranging from 1 hour to 24 hours, preferably ranging from 2 hours to 24 hours and preferably ranging from 6 to 20 hours at a temperature ranging from 110 to 115° C.

According to one particular variant, the chemical hydrolysis is carried out in two steps:

a first chemical hydrolysis carried out at a temperature ranging from 60 to 80° C. for a period ranging from 4 to 5 hours, then a second chemical hydrolysis carried out at a temperature ranging from 100 to 115° C. for a period ranging from 5 to 8 hours, it being possible for the two hydrolyses to be carried out without an intermediate pause step or by performing an intermediate pause step of between 1 hour and 7 days.

More specifically, the first chemical hydrolysis is carried out at 72° C. for 4.5 hours and the second chemical hydrolysis is carried out at 107° C. for 6 hours, an intermediate pause of 24 to 80 hours being performed between the two chemical hydrolyses.

Advantageously, the hydrolysate obtained at the end of the chemical hydrolysis, carried out in one or more steps, comprises less than 3.5 mol % of cystine relative to the total number of moles of amino acids of the hydrolysate.

The chemical hydrolysis, carried out in one or more steps, is followed by at least one of the following steps in this order:

a step of extracting the cystine and the tyrosine,
a desalifying step,
a filtration step.

The steps of extracting the cystine and the tyrosine are carried out by means of a base, preferably chosen from sodium hydroxide and potassium hydroxide, preferably sodium hydroxide. The steps of extracting the cystine and the tyrosine are conventional steps, the implementation of which is within the competence of those skilled in the art.

The steps of chemical hydrolysis and of extracting the cystine and the tyrosine can be followed by optional steps of purifying the hydrolysate obtained.

The desalifying step aims to remove the sodium chloride or the potassium chloride formed during the step of extracting the tyrosine by addition of sodium hydroxide or potassium hydroxide on hydrochloric acid. This desalifying step is preferably carried out by electrodialysis. The electrodialysis is conventionally carried out, by using pure water against the hydrolysate and by applying an electric current to the alternating stack of anionic and cationic membranes.

Preferably, the hydrolysate according to the present invention comprises less than 2 mol %, preferably less than 1 mol % of tyrosine relative to the total number of moles of amino acids of the hydrolysate; more preferably, the hydrolysate does not contain tyrosine.

Preferably, the hydrolysate according to the present invention comprises less than 2 mol %, preferably less than 1 mol % and preferably less than 0.5 mol % of cystine relative to the total number of moles of amino acids of the hydrolysate; more preferably, the hydrolysate does not contain cystine.

Advantageously, the hydrolysate according to the invention contains neither tyrosine nor cystine, the only traces of these amino acids being due to the limits of the operating conditions and of the material used during the extraction step. In addition, insofar as the hydrolysate according to the invention is not obtained following a reduction by electrolysis, it does not comprise cysteine.

Surprisingly and advantageously, the authors of the present invention have shown that the implementation of a filtration under the particular conditions of the invention makes it possible to achieve a high level of free amino acids without destruction or denaturation of said amino acids.

Advantageously, the filtration is carried out by means of a filtering membrane with a maximum calibre of 300 Da, preferably with a maximum calibre of 250 Da, and advantageously of a membrane with a calibre of 100-250 Da.

Advantageously, the filtration is carried out at a pressure of between 15 and 40 bar.

Advantageously, the filtration is carried out at a flow rate ranging from 300 to 900 l/h, preferably ranging from 400 to 800 l/h.

According to one particularly preferred embodiment, the filtration is carried out by means of a filtering membrane with a maximum calibre of 300 Da, preferably with a maximum calibre of 250 Da, and advantageously a membrane with a calibre ranging from 100 to 250 Da, at a pressure of between 15 and 40 bar and at a flow rate ranging from 300 to 900 l/h, preferably ranging from 400 to 800 l/h.

Advantageously, the filtration is a nanofiltration.

The filtration, or nanofiltration, consists in circulating, by means of a high-pressure pump, the desalified hydrolysate through a judiciously calibrated membrane. The fraction that passes through, called permeate, contains the free amino acids of interest, the fraction that is retained, called retentate, contains the peptides and the residual amino acids. The method is carried out using a tank with a recirculation pump until a stable amino acid content is obtained in the permeate.

The method carried out according to the invention makes it possible to obtain a hydrolysate comprising at least 94%, preferably at least 96%, advantageously 100% by weight of free amino acids relative to the total weight of the amino acids of the hydrolysate and which contains: at least 93%, preferably at least 95%, of valine in free form by weight relative to the total weight of valine in the hydrolysate, at least 90%, preferably at least 95%, of isoleucine in free form by weight relative to the total weight of isoleucine in the hydrolysate, at least 95%, preferably 100%, of leucine in free form by weight relative to the total weight of leucine in the hydrolysate.

In addition, the majority of the amino acids, in particular the following amino acids: threonine, serine, glycine, alanine, phenylalanine, lysine, arginine and proline, are at least 95% in free form relative to the total weight of said amino acid in the hydrolysate.

As already mentioned, the present invention is directed towards the oral use of the composition, in particular of the keratin hydrolysate, according to the invention or obtained according to the method of preparation according to the invention, as a starting material for animal feed.

The present invention is also directed towards a starting material comprising a composition, preferably a hydrolysate according to the invention, and optionally additional ingredients such as additional free amino acids, in particular at least one amino acid chosen from cystine, arginine, glutamic acid and aspartic acid.

Advantageously, by way of additional ingredient, L-cystine, or else other amino acids such as arginine, glutamic acid and aspartic acid, which are partly retained by the membrane during the nanofiltration, can be added.

The term "starting material" is intended to mean any products of plant or animal origin, in the natural, fresh or preserved state, and derived from their industrial transformation, and also organic or inorganic substances, optionally comprising additives, which are intended to be used for feeding animals orally, either directly as they are, or after transformation, for the preparation of composite animal feeds, or as carriers of premixes (Council Directive 96/25/EC of 29 Apr. 1996).

The starting material according to the present invention is an amino acid mixture intended to be incorporated in a complete and balanced feed or to be used as a food supplement. It is consequently intended to be administered orally to terrestrial and/or marine animals and/or to human beings. Said starting material does not belong to the therapeutic field.

The present invention relates more particularly to the use of the composition, in particular of the hydrolysate, in animal feed and more particularly as a starting material that is a source of free amino acids making it possible to dispense with food proteins of plant and/or animal origin which have a complex molecular structure and a high molecular weight.

Preferably, the starting material for the animal feed also comprises cystine.

Preferably, the starting material for the animal feed comprises, in addition to the amino acids of the hydrolysate, at least one additional amino acid chosen from arginine, glutamic acid and aspartic acid.

Preferably, the starting material for animal feed according to the present invention comprises the following amino acids, by weight, relative to the total weight of the amino acids of the composition:

aspartic acid in a content ranging from 6.00 to 8.00%, and of preferably 6.89% by weight;

threonine in a content ranging from 3.50 to 5.50%, and of preferably 4.50% by weight;

serine in a content ranging from 17.00 to 19.00%, and of preferably 17.91% by weight;

glutamic acid in a content ranging from 9.00 to 11.00%, and of preferably 9.84% by weight;

glycine in a content ranging from 17.00 to 19.00%, and of preferably 17.90% by weight;

alanine in a content ranging from 7.00 to 9.00%, and of preferably 7.95% by weight;

valine in a content ranging from 3.00 to 5.00%, and of preferably 3.71% by weight;

cystine in a content ranging from 1.00 to 3.00%, and of preferably 2.00% by weight;

methionine in a content ranging from 0.10 to 1.00%, and of preferably 0.25% by weight;

isoleucine in a content ranging from 1.00 to 3.00%, and of preferably 1.85% by weight;

leucine in a content ranging from 3.50 to 5.50%, and of preferably 4.53% by weight;

tyrosine in a content ranging from 0.10 to 1.00%, and of preferably 0.25% by weight;

phenylalanine in a content ranging from 4.00 to 6.00%, and of preferably 5.03% by weight;

lysine in a content ranging from 0.30 to 1.00%, and of preferably 0.50% by weight;

histidine in a content ranging from 0.30 to 1.00%, and of preferably 0.50% by weight;

arginine in a content ranging from 5.00 to 7.00%, and of preferably 5.79% by weight;

proline in a content ranging from 10.00 to 12.00%, and of preferably 10.60% by weight.

The formulation of the starting material for animal feed in accordance with the invention uses conventional methods which are within the general competence of those skilled in the art.

As already mentioned, the present invention is also directed towards a complete feed for animal feed comprising from 5 to 40% by weight of the composition or preferably of the hydrolysate according to the invention, relative to the total weight of said complete feed.

This complete feed is highly anallergic.

The complete feed for animal feed in accordance with the invention can be formulated with the excipients normally used in compositions intended for oral administration, notably humectants, thickeners, texturing agents, flavouring agents, coating agents, preservatives, antioxidants, colourants, plant extracts, non-protein ingredients such as starches, plant fibres, minerals and vitamins.

Of course, those skilled in the art will take care to select these excipients so as not to impair the properties of the complete feed for animal feed.

The complete feed for animal feed in accordance with the invention can be formulated in one of the following presentation forms: a pellet, a gel capsule, a dragée, a tablet, a soft or hard capsule, or else a suspension, a solution, a gel, a dry preparation containing less than 15% by weight of water, or a wet preparation comprising at least 50% by weight of water and at most 85% by weight of water.

The formulation of the complete feed for animal feed in accordance with the invention implements conventional methods which fall within the general competence of those skilled in the art.

The invention is also directed towards the use of the composition according to the invention or of the hydrolysate according to the invention, for preparing a starting material or a complete feed for animal feed.

The examples which follow aim to illustrate the invention without limiting the scope thereof.

EXAMPLES

Example 1—Hydrolysate 1

Preparation of Hydrolysate 1

4500 kg of poultry feathers are introduced into a 20 000-litre reactor/hydrolyser. A first chemical hydrolysis step is carried out by adding 18 000 litres of hydrochloric acid (24%); the hydrolysis is carried out at 72° C. for 4.5 hours. The product obtained is stored for 48 hours at ambient temperature (intermediate pause). Next, a second chemical hydrolysis is carried out by heating at 107° C. for 6 hours without the addition of acid. The product obtained is left to cool. The cystine and the tyrosine are extracted by precipitation with sodium hydroxide at a pH of between 4 and 5. The hydrolysate is desalified by electrodialysis. 22 000 kg of hydrolysate 1 in liquid form are obtained.

Example 2—Hydrolysate 2

Preparation of hydrolysate 2

1 kg of desalified hydrolysate 1 is diluted with 19.2 kg of purified water and conveyed, under a pressure of 20 bar with a flow rate of 400 l/h, through a nanofiltration membrane calibrated at 100-250 Da. The retentate collected weighs 5.2 kg, the permeate 14.55 kg. The entering desalified hydrolysate contains 93% of free amino acids (i.e. 0.19 kg), the exiting permeate contains 99.06% of free amino acids, i.e. 0.05 kg. The free amino acid yield is therefore 26.4%.

Example 3—Hydrolysate 3

Preparation of hydrolysate 3

1 kg of desalified hydrolysate 1 is diluted with 12.6 kg of purified water and conveyed, under a pressure of 36 bar with a flow rate of 800 l/h, through a nanofiltration membrane calibrated at 100-250 Da. The retentate collected weighs 5.2 kg, the permeate 8.55 kg. The entering desalified hydrolysate contains 93% of free amino acids (i.e. 0.19 kg), the exiting permeate contains 97.87% of free amino acids, i.e. 0.04 kg. The free amino acid yield is therefore 22.4%.

Results

Table 1 presents, for each amino acid present, the free amino acids/total amino acids weight fraction.

TABLE 1

| | Hydrolysate 1 Not in accordance with the invention | Hydrolysate 2 In accordance with the invention | Hydrolysate 3 In accordance with the invention |
|---|---|---|---|
| Aspartic Ac. | 97.19% | 100.00% | 92.31% |
| Threonine | 93.47% | 100.00% | 100.00% |
| Serine | 100.00% | 100.00% | 100.00% |
| Glutamic Ac. | 92.33% | 90.00% | 100.00% |
| Glycine | 90.69% | 100.00% | 96.84% |
| Alanine | 98.66% | 100.00% | 94.87% |
| Valine | 69.57% | 96.55% | 94.74% |
| Cystine | 75.47% | * | * |
| Methionine | 100.00% | * | 100.00% |
| Isoleucine | 76.59% | 93.33% | 90.00% |
| Leucine | 90.56% | 100.00% | 95.83% |
| Tyrosine | 71.75% | * | 100.00% |
| Phenylalanine | 95.15% | 100.00% | 100.00% |
| Lysine | 95.87% | 100.00% | 100.00% |
| Histidine | 100.00% | 100.00% | 100.00% |
| Arginine | 92.64% | 100.00% | 100.00% |
| Proline | 92.57% | 100.00% | 100.00% |
| Total | 90.86% | 99.06% | 97.87% |

* percentage of amino acid in free form less than 0.002% in the hydrolysate.

Determination of the Composition of Hydrolysate 2

The amino acids of hydrolysate 2 are assayed according to a method adapted from EC Regulation 152/2009.

The amino acids are separated by chromatography (HPLC) with an ion exchange column and assayed by reaction with ninhydrin and photometric detection at 570 nm.

The free amino acids content relative to the total weight of the amino acids is represented, for each amino acid of hydrolysate 2, in Table 2.

TABLE 2

| Amino acid | Content (wt %) in the composition |
|---|---|
| Asp | 1.89 |
| Thr | 5.36 |

TABLE 2-continued

| Amino acid | Content (wt %) in the composition |
|---|---|
| Ser | 22.08 |
| Glu | 2.84 |
| Gly | 22.08 |
| Ala | 9.46 |
| Val | 4.42 |
| L-Cystine | 0.00 |
| Met | 0.32 |
| Ile | 2.21 |
| Leu | 5.36 |
| Tyr | 0.32 |
| Phe | 5.99 |
| Lys | 0.63 |
| His | 0.63 |
| Arg | 3.79 |
| Pro | 12.62 |
| Total | 100.00 |

Example 4

Starting Material for Animal Feed

A starting material for animal nutrition is prepared from the composition of Table 2 to which L-cystine, glutamic acid, arginine and aspartic acid are added so as to obtain the following composition presented in Table 3.

The amino acids content relative to the total weight of the amino acids of the starting material for animal feed is represented, for each amino acid, in Table 3.

TABLE 3

| Amino acid | Content (wt %) in the composition |
|---|---|
| Asp | 6.89 |
| Thr | 4.50 |
| Ser | 17.91 |
| Glu | 9.84 |
| Gly | 17.90 |
| Ala | 7.95 |
| Val | 3.71 |
| L-Cystine | 2.00 |
| Met | 0.25 |
| Ile | 1.85 |
| Leu | 4.53 |
| Tyr | 0.25 |
| Phe | 5.03 |
| Lys | 0.50 |
| His | 0.50 |
| Arg | 5.79 |
| Pro | 10.60 |
| Total | 100.00 |

This composition is highly anallergic.

In addition, its palatability capacity with respect to cats and dogs was observed.

The invention claimed is:

1. A keratin hydrolysate comprising at least 94% by weight of free amino acids relative to the total weight of the amino acids of the hydrolysate,
said hydrolysate comprising at least the following amino acids:
at least 93% of valine in free form by weight relative to the total weight of valine in the hydrolysate,
at least 90% of isoleucine in free form by weight relative to the total weight of isoleucine in the hydrolysate, and
at least 95% of leucine in free form by weight relative to the total weight of leucine in the hydrolysate,
wherein the hydrolysate comprises the following amino acids in free form, by weight, relative to the total weight of the amino acids of the hydrolysate:
threonine in a content ranging from 4.00 to 6.00% by weight;
valine in a content ranging from 4.00 to 5.00% by weight;
isoleucine in a content ranging from 1.50 to 3.00% by weight;
leucine in a content ranging from 5.00 to 6.00% by weight;
tyrosine in a content ranging from 0.30 to 1.00% by weight;
lysine in a content ranging from 0.5 to 1.50% by weight;
wherein the keratin hydrolysate is produced by a method comprising the following steps, in this order:
subjecting poultry keratin material to chemical hydrolysis, wherein the chemical hydrolysis is carried out in two steps:
a first chemical hydrolysis carried out at a temperature ranging from 60 to 80° C. for a period ranging from 4 to 5 hours,
a second chemical hydrolysis carried out at a temperature ranging from 100 to 115° C. for a period ranging from 5 to 8 hours,
the two hydrolyses being carried out without an intermediate pause step or by performing an intermediate pause step of between 1 hour and 7 days;
extracting the tyrosine and the cystine from said hydrolysate;
desalifying said hydrolysate; and
carrying out a filtration by means of a filtering membrane with a maximum calibre of 300 Da, at a pressure of between 15 and 40 bar and at a flow rate ranging from 300 to 900 l/h;
optionally drying.

2. The hydrolysate according to claim 1, further comprising the following free amino acids:
at least 95% of threonine in free form by weight relative to the total weight of threonine in the hydrolysate;
at least 95% of serine in free form by weight relative to the total weight of serine in the hydrolysate;
at least 95% of glycine in free form by weight relative to the total weight of glycine in the hydrolysate;
at least 95% of alanine in free form by weight relative to the total weight of alanine in the hydrolysate;
at least 95% of phenylalanine in free form by weight relative to the total weight of phenylalanine in the hydrolysate;
at least 95% of lysine in free form by weight relative to the total weight of lysine in the hydrolysate;
at least 95% of arginine in free form by weight relative to the total weight of arginine in the hydrolysate; and
at least 95% of proline in free form by weight relative to the total weight of proline in the hydrolysate.

3. The hydrolysate according to claim 1, wherein the hydrolysate comprises less than 2 mol % of cystine relative to the total number of moles of amino acids of the hydrolysate.

4. The hydrolysate according to claim 1, further comprising the following amino acids in free form, by weight, relative to the total weight of the amino acids of the hydrolysate:
aspartic acid in a content ranging from 1.00 to 7.50% by weight;

serine in a content ranging from 10.00 to 25.00% by weight;
glutamic acid in a content ranging from 2.00 to 10.50% by weight;
glycine in a content ranging from 6.00 to 25.00% by weight;
alanine in a content ranging from 3.50 to 12.00% by weight;
methionine in a content ranging from 0.10 to 2.00% by weight;
phenylalanine in a content ranging from 3.50 to 8.00% by weight;
histidine in a content ranging from 0.2 to 5.0% by weight;
arginine in a content ranging from 2.50 to 6.50% by weight; and
proline in a content ranging from 9.00 to 15.00% by weight.

5. A method for preparing the hydrolysate according to claim 1, in which the keratin material is a poultry keratin material, said method comprising at least the following steps, in this order:
subjecting the keratin material to chemical hydrolysis, wherein the chemical hydrolysis is carried out in two steps:
a first chemical hydrolysis carried out at a temperature ranging from 60 to 80° C. for a period ranging from 4 to 5 hours,
a second chemical hydrolysis carried out at a temperature ranging from 100 to 115° C. for a period ranging from 5 to 8 hours,
the two hydrolyses being carried out without an intermediate pause step or by performing an intermediate pause step of between 1 hour and 7 days;
extracting the tyrosine and the cystine from said hydrolysate;
desalifying said hydrolysate; and
carrying out a filtration by means of a filtering membrane with a maximum calibre of 300 Da, at a pressure of between 15 and 40 bar and at a flow rate ranging from 300 to 900 l/h;
optionally drying.

6. A starting material for animal feed, comprising from 80 to 100% by weight of the hydrolysate prepared according to the method of claim 5 relative to the total weight of said starting material.

7. The material for animal feed according to claim 6, further comprising cystine.

8. A complete feed for animal feed, comprising from 5 to 40% by weight of the hydrolysate prepared according to the method of claim 5.

9. A starting material for animal feed, comprising from 80 to 100% by weight of the hydrolysate according to claim 1 relative to the total weight of said starting material.

10. The starting material for animal feed according to claim 9, further comprising cystine.

11. The starting material for animal feed according to claim 9, further comprising at least one additional amino acid selected from the group consisting of arginine, glutamic acid and aspartic acid.

12. The starting material for animal feed according to claim 9, comprising the following amino acids, by weight, relative to the total weight of the amino acids of the starting material:
aspartic acid in a content ranging from 6.00 to 8.00% by weight;
threonine in a content ranging from 3.50 to 5.50% by weight;
serine in a content ranging from 17.00 to 19.00% by weight;
glutamic acid in a content ranging from 9.00 to 11.00% by weight;
glycine in a content ranging from 17.00 to 19.00% by weight;
alanine in a content ranging from 7.00 to 9.00% by weight;
valine in a content ranging from 3.00 to 5.00% by weight;
cystine in a content ranging from 1.00 to 3.00% by weight;
methionine in a content ranging from 0.10 to 1.00% by weight;
isoleucine in a content ranging from 1.00 to 3.00% by weight;
leucine in a content ranging from 3.50 to 5.50% by weight;
tyrosine in a content ranging from 0.10 to 1.00% by weight;
phenylalanine in a content ranging from 4.00 to 6.00% by weight;
lysine in a content ranging from 0.30 to 1.00% by weight;
histidine in a content ranging from 0.30 to 1.00% by weight;
arginine in a content ranging from 5.00 to 7.00% by weight; and
proline in a content ranging from 10.00 to 12.00% by weight.

13. A complete feed for animal feed, comprising from 5 to 40% by weight of the hydrolysate according to claim 1.

14. A composition comprising at least 94% by weight of free amino acids relative to the total weight of the amino acids of the composition,
said composition comprising at least the following amino acids:
at least 93% of valine in free form by weight relative to the total weight of valine in the composition;
at least 90% of isoleucine in free form by weight relative to the total weight of isoleucine in the composition;
at least 95% of leucine in free form by weight relative to the total weight of leucine in the composition;
at least 95% of threonine in free form by weight relative to the total weight of threonine in the composition;
at least 95% of serine in free form by weight relative to the total weight of serine in the composition;
at least 95% of glycine in free form by weight relative to the total weight of glycine in the composition;
at least 95% of alanine in free form by weight relative to the total weight of alanine in the composition;
at least 95% of phenylalanine in free form by weight relative to the total weight of phenylalanine in the composition;
at least 95% of lysine in free form by weight relative to the total weight of lysine in the composition;
at least 95% of arginine in free form by weight relative to the total weight of arginine in the composition; and
at least 95% of proline in free form by weight relative to the total weight of proline in the composition,
wherein the composition comprises the following amino acids in free form, by weight, relative to the total weight of the amino acids of the composition:
threonine in a content ranging from 4.00 to 6.00% by weight;
valine in a content ranging from 4.00 to 5.00% by weight;
isoleucine in a content ranging from 1.50 to 3.00% by weight;

leucine in a content ranging from 5.00 to 6.00% by weight;

tyrosine in a content ranging from 0.30 to 1.00% by weight; and lysine in a content ranging from 0.5 to 1.50% by weight.

15. A starting material for animal feed, comprising from 80 to 100% by weight of the composition according to claim 14 relative to the total weight of said starting material.

16. The starting material for animal feed according to claim 15, further comprising cystine.

17. The starting material for animal feed according to claim 15, further comprising at least one additional amino acid selected from the group consisting of arginine, glutamic acid and aspartic acid.

18. The starting material for animal feed according to claim 15, comprising the following amino acids, by weight, relative to the total weight of the amino acids of the starting material:

aspartic acid in a content ranging from 6.00 to 8.00% by weight;

threonine in a content ranging from 3.50 to 5.50% by weight;

serine in a content ranging from 17.00 to 19.00% by weight;

glutamic acid in a content ranging from 9.00 to 11.00% by weight;

glycine in a content ranging from 17.00 to 19.00% by weight;

alanine in a content ranging from 7.00 to 9.00% by weight;

valine in a content ranging from 3.00 to 5.00% by weight;

cystine in a content ranging from 1.00 to 3.00% by weight;

methionine in a content ranging from 0.10 to 1.00% by weight;

isoleucine in a content ranging from 1.00 to 3.00% by weight;

leucine in a content ranging from 3.50 to 5.50% by weight;

tyrosine in a content ranging from 0.10 to 1.00% by weight;

phenylalanine in a content ranging from 4.00 to 6.00% by weight;

lysine in a content ranging from 0.30 to 1.00% by weight;

histidine in a content ranging from 0.30 to 1.00% by weight;

arginine in a content ranging from 5.00 to 7.00% by weight; and proline in a content ranging from 10.00 to 12.00% by weight.

19. A complete feed for animal feed, comprising from 5 to 40% by weight of the composition according to claim 14.

* * * * *